Nov. 6, 1962  A. KROLICKI  3,062,558
VERTICALLY ADJUSTABLE TRAILER
Filed May 22, 1959  2 Sheets-Sheet 2
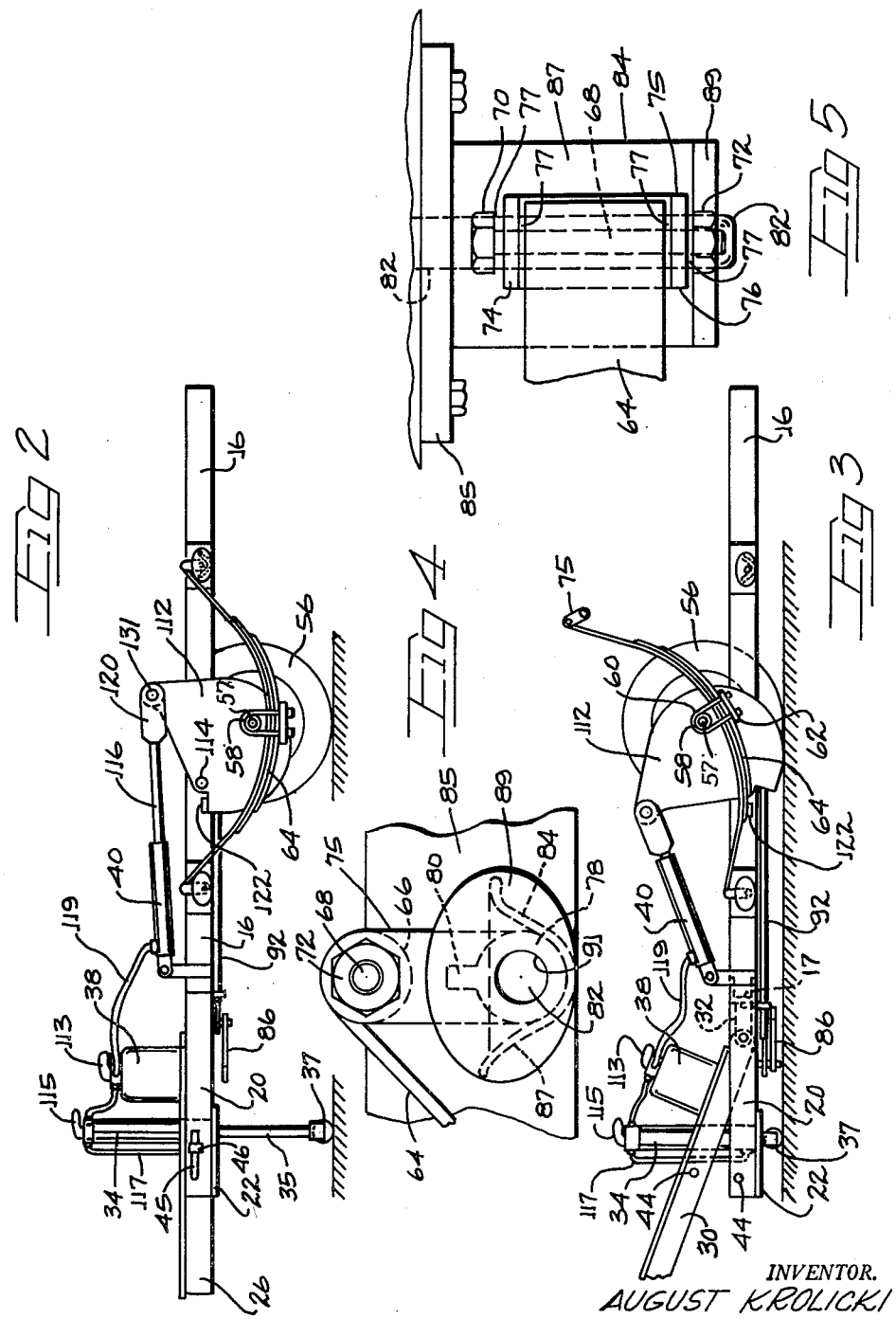
INVENTOR.
AUGUST KROLICKI
BY
SMITH, WILSON, LEWIS & McRAE

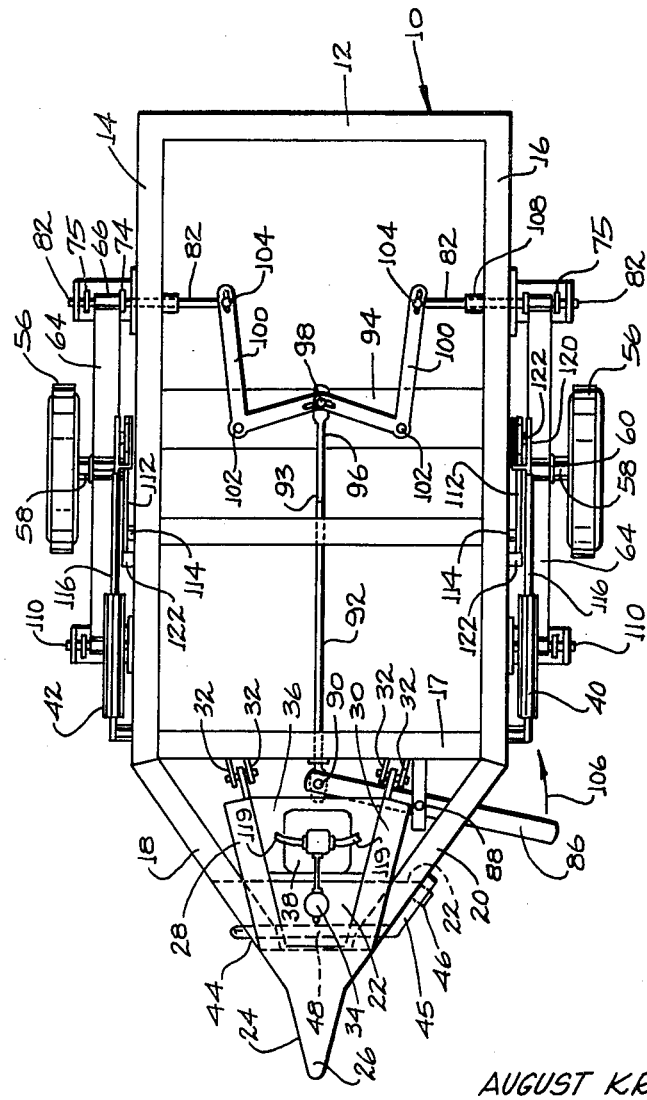

United States Patent Office 3,062,558
Patented Nov. 6, 1962

3,062,558
VERTICALLY ADJUSTABLE TRAILER
August Krolicki, 13042 S. Morrow Circle,
Dearborn, Mich.
Filed May 22, 1959, Ser. No. 815,125
2 Claims. (Cl. 280—43.23)

This invention relates to a vehicle structure having self-contained means for raising and lowering its frame relative to the ground surface so as to permit easier loading and unloading of the vehicle contents. The invention has general application to various types of cargo-carrying structures, as for example boat trailers, animal trailers, general purpose trailers, fertilizer spreaders, and farm implement structures.

In many situations there is a need for a trailer construction in which either or both end portions of a vehicle structure can be lowered toward the ground surface so as permit easier loading and unloading of the vehicle contents. There have been proposed various devices for lowering and raising vehicle structures. However such devices have not become widely used because they have sacrificed on one or more desired features in order to obtain the lowering and raising action. Thus, some devices have required special costly spring structures for road shock cushioning purposes, but the service life of these structures has not been satisfactory. Other devices have utilized special vehicle body configurations which have had the effect of reducing the cargo space and which were necessarily of relatively high cost as compared with conventional vehicle constructions.

In most of the prior art devices there have been provided means for lowering the rear end of the vehicle structure without any corresponding lowering of the front end. As a result the "easy loading" features in general have not been entirely attained.

A primary object of the present invention is to provide a vehicle structure having raising and lowering means thereon of a simplified, low cost character as compared with previous devices.

Another object of the invention is to provide a raisable and lowerable vehicle structure wherein the component mechanisms are of long life design, the arrangement being such that the mechanisms interfit together to provide a jam-free operation.

A further object of the invention is to provide a raisable and lowerable vehicle structure wherein the component mechanisms can be easily operated by unskilled personnel.

An additional object is to provide a raisable and lowerable vehicle structure which requires relatively little maintenance.

A further object is to provide a vehicle with a raising and lowering attachment structure, the arrangement being such that the attachment structure can be formed separately from the vehicle and installed thereon with minimum modification of the vehicle construction, thereby enabling the attachment to be employed with conventional vehicle structures.

Another object is to provide a raisable and lowerable vehicle structure having conventional half elliptical leaf springs for road shock cushioning purposes.

Another object of the invention is to provide a raisable and lowerable vehicle structure wherein the raising and lowering components are disposed adjacent the sides and lower portions of a conventional vehicle body, thereby enabling the vehicle to retain its full cargo capacity while achieving the desired raising and lowering functions.

A further object of the invention is to provide a vehicle construction having means thereon for selectively lowering its front and rear ends, thereby enabling the vehicle to be disposed in horizontal or inclined positions for easy loading and unloading of the vehicle contents.

Other objects of this invention will appear in the following description and appended claims, reference being had to the accompanying drawings forming a part of this specification wherein like reference characters designate corresponding parts in the several views.

In the drawings:
FIG. 1 is a plan view of a vehicle frame structure having one embodiment of the invention incorporated therewith.
FIG. 2 is a side elevational view of the FIG. 1 embodiment with one of the vehicle wheels removed for illustration purposes.
FIG. 3 is a side elevational view of the FIG. 1 embodiment taken with the vehicle frame in a lowered position.
FIG. 4 is an enlarged elevational view of a spring mounting mechanism employed in the FIG. 1 embodiment.
FIG. 5 is a top plan view of the FIG. 4 mechanism.

Before explaining the present invention in detail, it is to be understood that the invention is not limited in its application to the details of construction and arrangement of parts illustrated in the accompanying drawings, since the inventiton is capable of other embodiments and of being practiced or carried out in various ways. Also, it is to be understood that the phaseology or terminology employed herein is for the purpose of description and not of limitation.

Referring to the drawing there is shown a trailer structure, including a frame 10 comprised of a rear channel 12 side channels 14 and 16, and a front channel 17. Extending angularly forwardly from channels 14 and 16 are two channels 18 and 20 which are interconnected together along their lower flange portions by means of a plate 22.

The vehicle structure defined by members 12 through 22 is mounted for pivotal movement to a hitch structure 24. Hitch structure 24 comprises a frontal portion 26 adapted to make rotary connection with a conventional ball type mounting structure (not shown) carried by the pulling vehicle, and a pair of rearwardly diverging angle members 28 and 30 having their rear end portions pivotally connected between ears 32 extended from the frame member 17 as shown in FIG. 1. As seen in FIG. 1 the hitch structure 24 is of generally V-shaped configuration, with the space between members 28 and 30 receiving the fluid cylinder 34 which is mounted on the plate portion 22 of the frame structure 10. The rear end portions of members 28 and 30 are interconnected by a plate 36 which forms a support for a conventional pump unit 38, said pump unit being adapted to supply fluid to the three cylinders 34, 40 and 42 for raising the vehicle structure.

During transit of the vehicle structure it is desirable that hitch structure 24 be rigid with frame structure 10. Therefor there is preferably provided a latch structure for releasably retaining the hitch structure in its FIG. 2 position of alignment with the frame structure 10. The latching means may take various different configurations and arrangements, but as shown in the drawings the latch means comprises a series of aligned openings 44 in hitch structure 24 and the channels 18 and 22, together with a removable latching bar 48 adapted to extend through the openings as shown in FIG. 1. End portion 45 of the bar is turned at an angle to seat in a bracket 46 during movement of the vehicle. When it is desired to lower the vehicle frame the latching bar is rotated out of the bracket and withdrawn from the openings 44.

For supporting the vehicle during transit there are provided two road-engaging wheels 56, each of said wheels being provided with an axle 57 rotatable in a housing 58 carried by a large disk 112. Each of the axle housings engages a pair of U-bolts 60 which extend through a plate 62 for mounting the respective axle housing above a conventional half elliptical leaf spring 64. Each of the leaf springs has its end enlarged at 66 (FIG. 4) to form hollow hub portions for reception therethrough of a bolt 68, said bolt having a head 70 and being threaded into a nut 72. The shank portion of bolt 68 extends through a link structure 75 defined by two parallel arms 74 and 76, and an interconnecting web portion 78, said web portion being of generally tubular configuration as seen in FIG. 4, except that it is provided with a rib 80 for strengthening the arms 74 and 76. Washers are provided at 77 for spacing and locking purposes, the arrangement being such that nut 72 is threaded onto shank portion 68 sufficiently to cause the link structure 75 to have a slight play relative to hub portion 66 of the spring. By this construction when the vehicle is in the FIG. 2 position the springs can move vertically, with the links shifting slightly to accommodate the resulting difference in spacing of the front and rear portions of the spring. The result is a satisfactory cushioning action of the vehicle during transit.

The front ends of the springs are preferably mounted to have a continuous pivotal connection with the vehicle frame, whereas the rear ends of the springs are preferably mounted to have a discontinuous pivotal connection with the vehicle frame as will be apparent from an inspection of FIG. 3. Each discontinuous pivotal connection is provided by a slidable latch pin 82 and an upwardly opening saddle structure 84. Structure 84 includes a mounting flange or plate portion 85, an upwardly flaring generally V-shaped web portion 87, and an outer flange portion 89 having an opening 91 therethrough.

It will be noted from a comparison of FIGS. 2 and 3 that during lowering movement of the vehicle the rearmost link structures 75 are disengaged from their connections with the frame portions 14 and 16. Thus, the link structures are pivotally but removably carried on the latch pins 82, said latch pins being mounted for retracting movements out of the hub portions 78 to permit the link structures to be disengaged from the upwardly opening seat structures 84. Each latch pin 82 is preferably tapered or bevelled at its leading end so as to form a bullet-like nose portion for facilitating easy entrance into the openings 91 in hubs 78 during latching of the links to the vehicle frame, this action being obtained irrespective of any slight misalignment due to manufacturing differences or service conditions. Additionally, the V-shaped configuration of portion 87 provides a seating structure of relatively wide opening so that the link structures 75 are accurately guided into the desired FIG. 4 position aligned with latch pins 82 as shown in FIG. 4. The construction is such as to provide a jam-free movement of the latch pins into and out of the openings 91 in hub structures 78.

Movement of each latch pin may be effected by a manually operated lever 86, said lever being fulcrumed at 88 on a portion of the frame structure 10, and said lever having a pivotal connection at 90 with the thrust rod 92. The front portion of thrust rod 92 extends below member 17 and turns upwardly at 93 to cause the rear portion 96 of the thrust rod to overlie cross member 94. Pin structure 98 is extended through rod 92 and slots in the bell cranks 100, said bell cranks being fulcrumed at 102 and having their rear end portions slotted for connection with the pin structures 104 carried by latch pins 82. In operation, manual movement of lever 86 in the arrow 106 direction is effective to draw rod 92 forwardly so as to pivot the bell cranks 100 in a direction to withdraw latch pins 102 from their FIG. 1 locked positions. Reverse movement of the lever 86 is effective to drive the latch pins 82 into positions locked with the link structures 85 as shown in FIG. 1. The latch pins are precluded from excessive movement by the integrally formed enlarged portions 108 (FIG. 1).

The forward mounting connection for each of the leaf springs 64 is preferably similar to that provided for the rear mounting connection shown in FIG. 4, except that the link structures are not adapted to be separated from their connections with the vehicle frame structure. Thus, fixed pivot pins are provided at 110 (FIG. 1) in lieu of the retractable latch pins 82.

It will be noted from FIGS. 1 and 2 that each of the axle housings 58 is fixedly carried on a disc 112, each disc being pivotally mounted on a pin 114 extending from the vehicle frame structure 10. Each disc is pivotally connected with the piston rod 116 of a fluid cylinder 40 or 42, the connection being effected by a fork structure 120 extended from the piston rod, the parallel arm portions of said fork structure receiving the pivot pin 131 which extends through a portion of disc 112.

It will be seen that when pump 38 (FIG. 3) is operated to pump pressure fluid through the lines 119 into the fluid cylinders 40 and 42 the piston rods 116 are driven outwardly from the FIG. 3 position toward the FIG. 2 position. As each rod 116 moves outwardly its disc 112 pivots around pivot 114, and since the axle housing can have no bodily displacement the pivot 114 must move upwardly so as to carry frame structure 10 from its FIG. 3 position to its FIG. 2 position. As the vehicle frame moves toward its FIG. 2 position each of the rear link structures 75 engages its respective converging seat structure 84 so as to be cammed into a position wherein the bore 91 in its hub portion 78 is accurately aligned with the adjacent latch pin 82.

When the link structures are in the FIGS. 2, 4 positions, lever 86 may be operated to advance the latch pins into the openings in the links for operatively mounting the springs 64 in supporting engagement relative to the vehicle frame structure 10. There is preferably provided on the vehicle structure a pair of abutment elements 122 arranged to engage a portion of the adjacent disc 112 as the frame structure approaches the elevated position. After the latch pins 82 are locked the abutment structures 122 operate to prevent clockwise movement of the discs around the pivots 114 from the FIG. 2 position during travel of the vehicle. However the discs are free to pivot in counterclockwise directions since the fluid pressure in cylinders 40 and 42 is preferably reduced during transit of the vehicle. It will be noted that the load is carried at the ends of the springs with the central portion of the spring being free for upward deflection in response to road irregularity. Links 75 pivot to accommodate any difference in spring end spacing caused by the upward deflection, the arrangement being such as to provide a shock-free ride, even over relatively bumpy terrain.

To lower the vehicle frame to its FIG. 3 position the lever 86 is manually operated to retract the latch pins 82. The manually engageable valve operator 113 is then operated to reduce the fluid pressure in cylinders 40 and 42 so as to allow the weight of the vehicle frame to pivot the discs 112 around the axle housings 58 and permit lowering of the frame toward its FIG. 3 position. Concurrently or at different periods the manual valve operator 115 may be operated to reduce the pressure in the upper end of fluid cylinder 34 so as to permit the front end portion of the vehicle frame to be lowered. If the fluid pressure in the upper end of cylinder 34 is reduced after reduction of the fluid pressures within cylinders 40 then the vehicle frame will initially assume a tilted position with its front end raised above its lower end. This tilted position may in certain instances be of material value in facilitating the loading or unloading of a particular type of cargo, since for example the tilted position of the vehicle floor will allow articles to be easily rolled on the floor surface toward the rear end of the vehicle. If the fluid pressure in the upper end of cylinder 34 is reduced concurrently with reduction of fluid pressure in cylinder 40 then the vehicle will maintain a substantially horizontal position during its lowering movement; this action may be of advantage in certain situations where it is necessary that the cargo be prevented from shifting as by an inclination of the vehicle floor surface. If the fluid pressure in cylinder 34 is reduced before reduction of the fluid pressure in cylinders 40 then the vehicle will initially assume an inclined position with its rear end raised above its front end. This action is advantageous in that it permits cargo to be shifted from the rear end toward the front end with relatively little effort.

After loading of the vehicle it is moved from its FIG. 3 position to its FIG. 2 position by pumping fluid from pump-reservoir unit 38 into cylinders 40, 42, and the upper end of cylinder 34. When the cylinders have been actuated the manually-operated lever 86 is moved to force the latch pins 82 through the bores in the link structures 75 to operatively connect the rear ends of the springs 64 with the frame structure. Also the latching bar 48 is moved through the openings 44 to mechanically lock the hitch structure to the vehicle frame structure. Fluid is then pumped into the lower end of cylinder 34 via line 117 to raise the piston rod 35, since the small wheel 37 is not utilized as a road-engaging element during transit of the vehicle, the sole purpose of wheel 37 being to support the front end portion of the frame 10 during lowering movement of the frame rear portion.

It will be noted that the illustrated vehicle structure is of relatively simple construction considering the many lower-raising operations which it performs. The structure utilizes a conventional trailer frame which may be provided with a conventional superstructure (not shown), since the component mechanisms of the present invention are disposed below, in front, and on the sides of the trailer frame. The hitch structure 24 is not of conventional construction, but it can be constructed as an operational attachment, with minimum modification of the conventional vehicle frame structure required for its incorporation therewith. In this connection the channel portions 18 and 20 are of conventional construction except that they are not interconnected together to form a hitch structure as in conventional units. Rather they have been cut off at their front portions and the plate 22 extended thereacross to operatively connect them together. The hitch structure 24 can be incorporated with the vehicle frame structure by merely providing the openings 44 and latching bar 48. Also, each of the component structures adjacent the side portions of the vehicle can be operatively installed (as by bolting) without substantial modification of the vehicle frame structure. Thus the component parts of the illustrated embodiment are adapted for use with existing trailer structures.

Although the illustrated construction has achieved desired features of flexibility, utilization of existing structures, and easy operation, yet it has not sacrificed on road cushioning features, since the springs 64 are of the semi-elliptical design which has been found to be very efficient for cushioning purposes.

Although a specific embodiment of the invention has been shown in the drawings, it will be appreciated that various modifications may be resorted to without departing from the spirit of the invention as defined in the appended claims.

I claim:

1. In a tiltable trailer, a frame having a pair of spaced, longitudinally extending side rails, each of said side rails having one end of an elongated leaf spring pivotally connected thereto, a rocker plate pivotally connected to each of said side rails, a stub axle connected to each of said rocker plates, a wheel rotatably journaled on each of said axles, means connecting a median portion of each of said springs to the corresponding axle whereby each said spring, axle and wheel can pivot as an assembly relative to said side rail to move said frame vertically, each of said springs being releasably connected by a pin at its other end to one of said side rails, a pair of bell cranks pivotally mounted on said frame with their one ends superimposed and with their other ends respectively pivotally connected to said pins, a lever pivoted on said frame, a connecting rod pivotally connected at its one end to said lever and at its other end to said bell crank one ends, each of said side rails having one end of a hydraulic cylinder and piston assembly pivotally connected thereto, with the other end of said assembly pivotally connected to the plate carried by said rail, and means for applying fluid to said cylinders to rock said plate, spring and wheel asemblies with respect to said side rails when said lever is moved to release said pins from locking engagement with said spring ends.

2. In a tiltable trailer having front and rear ends, a frame having a pair of spaced longitudinally extending side rails, a leaf spring pivotally connected at one end to each of said side rails, a rocker plate pivotally connected to each of said side rails, an axle connected to each of said rocker plates, a wheel rotatably journaled on each of said axles, means connecting a median portion of each of said springs to each of said axles whereby each said spring, axle and wheel can pivot as an asembly relative to said side rails to move said rear end of said frame vertically, means releasably connecting the other ends of each said spring to its said side rail, stop means on said frame engageable with said rocker plates to limit pivotal movement of said plates to the point of alignment of said other ends of said springs with said releasable connecting means, a hydraulic cylinder and piston assembly pivotally connected at one end to each of said side rails and at the other end to the corresponding plate, a pair of bell cranks pivotally mounted on said frame with their one ends superimposed and with their other ends respectively pivotally connected to said releasable connection means, a lever pivoted on said frame, a connecting rod pivotally connected at its one end to said lever and at its other end to said bell crank inner ends, means for applying fluid to said cylinders to rotate said plates, said springs and said wheels with respect to said side rails when said lever is moved to release said connections from locking engagement with said spring ends to move the rear end of said trailer vertically, and means for moving the front end of said trailer vertically.

References Cited in the file of this patent

UNITED STATES PATENTS

| | | |
|---|---|---|
| 1,325,604 | Andrew | Dec. 23, 1919 |
| 1,477,477 | Dunnet | Dec. 11, 1923 |
| 2,002,605 | Kincaid | May 28, 1935 |
| 2,059,205 | Buffington | Nov. 3, 1936 |
| 2,495,449 | Francis | Jan. 24, 1950 |
| 2,532,577 | Silver | Dec. 5, 1950 |
| 2,712,277 | Rutter | July 5, 1955 |
| 2,719,726 | Johnston | Oct. 4, 1955 |
| 2,740,543 | Mounsdon | Apr. 3, 1956 |
| 2,774,606 | Burweger | Dec. 18, 1956 |
| 2,835,400 | Latzke | May 20, 1958 |
| 2,843,397 | Bastow | July 15, 1958 |
| 2,872,209 | Walker | Feb. 3, 1959 |
| 2,900,194 | DeLay | Aug. 18, 1959 |
| 2,940,768 | Thompson | June 14, 1960 |